219-121 SR
MTR05 XR 3,154,371
[redacted]

306-109

HIGH SPEED, HIGH INTENSITY OPTICAL RECORDING SYSTEM

Filed Oct. 26, 1962 3 Sheets-Sheet 1 scan

INVENTOR:
Wayne R. Johnson
By Keith D. Beecher
Attorney

Oct. 27, 1964 W. R. JOHNSON 3,154,371

HIGH SPEED, HIGH INTENSITY OPTICAL RECORDING SYSTEM

Filed Oct. 26, 1962 3 Sheets-Sheet 2

INVENTOR:
Wayne R. Johnson

By Keith D. Beecher
Attorney

Oct. 27, 1964 W. R. JOHNSON 3,154,371

HIGH SPEED, HIGH INTENSITY OPTICAL RECORDING SYSTEM

Filed Oct. 26, 1962 3 Sheets-Sheet 3

INVENTOR:
Wayne R. Johnson

By Keith D. Beecher
Attorney

United States Patent Office 3,154,371
Patented Oct. 27, 1964

3,154,371

HIGH SPEED, HIGH INTENSITY OPTICAL RECORDING SYSTEM

Wayne R. Johnson, Los Angeles, Calif., assignor to Winston Research Corporation, Los Angeles, Calif., a corporation of California Filed Oct. 26, 1962, Ser. No. 233,249
5 Claims. (Cl. 346—108)

The present invention relates to optical recording systems and apparatus, and it relates more particularly to an improved optical recording system for the high speed/high intensity recording of signals extending through a wide range of frequencies.

The limited intensity of the light sources previously available for optical recording systems has meant that the prior art type of optical recording system has relatively limited utility. However, the recent advent of the laser light source has made the provision of high speed/high density optical recording systems possible and feasible.

Lasers have been operated successfully since 1960. The laser, or optical maser as it is sometimes called, amplifies light and radiates the amplified light in the form of a coherent, extremely high intensity light beam. A description of the laser may be found, for example, in the Encyclopedia of Electronics, Susskind, published 1962, by the Reinhold Publishing Company.

An object of the present invention is to provide an improved high density optical recording system which utilizes a high intensity light source, such as a laser, and in which a scanning recording/reproducing light beam from the source is focused to an extremely small spot size on the recording medium storage of the recording signals, or for the proper reproduction of such recorded signals.

Another object is to provide such an improved high density optical recording system in which unique controls are provided to maintain the scanning light beam in a sharply focused condition on the recording medium in the presence of variations in ambient conditions.

Yet another object is to provide such an improved high density optical recording system in which unique controls are provided to assure proper registry of a scanning light beam with recordings on the recording medium for the proper reproduction of such recordings.

A still further object is to provide such an improved high density optical recording system in which unique controls are provided to control the speed of the recording medium and/or to prevent skewing of the recording medium.

Other objects and advantages of the invention will become apparent from a consideration of the following description, when the description is taken in conjunction with the accompanying drawings, in which.

The improved optical recording system to be described is espcially advantageous in that extremely high storage density of the recorded signals may be achieved. This is possible because the high intensity light source of the system produces a coherent light beam which may be focused to an extremely small spot on the surface of the recording medium.

Also, the high intensity light source of the system of the invention permits the recording to be carried out at an extremely high speed so that the system is capable of recording and storing signals through a wide frequency band. For example, video signals extending from 0 to 20 megacycles may be conveniently recorded by the optical recording system of the invention.

Figure 1:
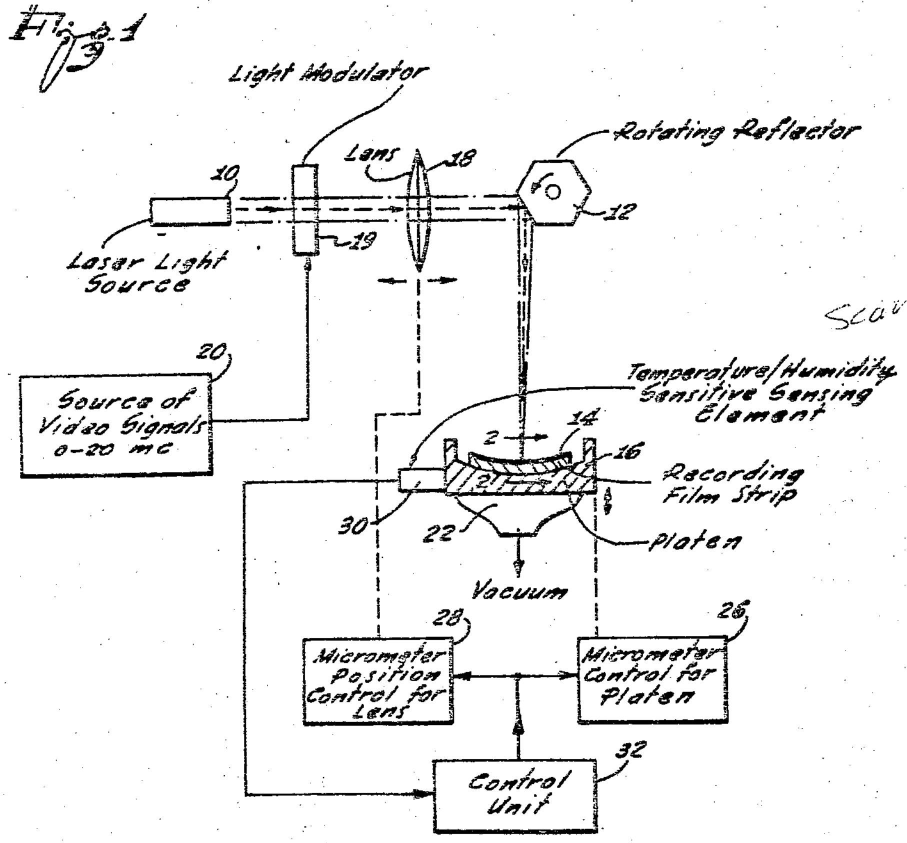
FIGURE 1 is a schematic representation of an optical recording system constructed in accordance with the concepts of one embodiment of the invention.

The optical recording system shown schematically in FIGURE 1 includes a laser light source 10. The laser light sources produces a coherent high intensity light beam along a particular path. A rotatable reflecting member 12 is disposed in the light path of the laser light beam, and this reflecting member is rotatably driven, so that the beam may be reflected and scanned transversely acress a recording film strip 14.

The film strip 14 is supported on a platen 16, and is moved across the platen in FIGURE 1 in a direction perpendicular to the plane of the paper. The rotatable movement of the reflecting member 12 causes the light beam to be recurrently scanned transversely across the film strip 14, as the film strip is drawn along its particular path.

A lens 18 is interposed in the path of the laser light beam between the light source 10 and the rotatable reflecting member 12. This lens causes the light beam to be focused to a sharp point (FIGURE 2) beneath the surface of the photo-sensitive emulsion coating on the recording medium 14. The recording medium 14 may, for example, be formed of an optical grade transparent Mylar base. The photo-sensitive emulsion is formed on the base, and the density of the emulsion is varied in accordance with the modulations on the laser light beam which is transversely scanned across the recording medium.

The laser light beam from the source 10 is intensity modulated by a suitable light modulator 19. The light modulator 19 is disposed in the path of the laser light beam between the source 10 and the lens 18. A source 20 of video signals, for example, is coupled to the light modulator 19. These signals may, for example, extend through a frequency range of from 0 to 20 megacycles, and they cause the light modulator 19 to intensity modulate the laser light beam. Light modulators which respond to applied electrical signals to intensity modulate a light beam are well known. For that reason, it is believer that a detailed description of the modulator 19 is unnecessary herein.

The platen 16 is coupled to a manifold 22 which, in turn, is coupled to an appropriate vacuum pressure source. The construction is such that a vacuum pressure is exerted at the surface of the platen 16 to hold the recording film strip 14 securely in the plane of its particular path. The platen 16 is curved, as shown, to correct for geometric distortions of the scanning beam due to the rotation of the reflecting member 12. This enables the beam to be maintained focused at a point at a particular level in the photo emulsion shown in FIGURE 2. The surface of the platen 16 is optically ground and lapped to a smooth arcuate configuration.

The rotating reflecting member 12 has a polygonal peripheral surface, as illustrated, and it may be rotated at an extremely high speed to produce corresponding high speed cyclic scanning of the light beam across the recording medium. The rotating reflecting member 12 may be constructed, for example, in the manner described in an article at page 134 of the April 1961 edition of "Scientific American." The polygonal faces of the reflecting member 12 are optically ground in the usual precise manner to exhibit planar surfaces.

Figure 2:
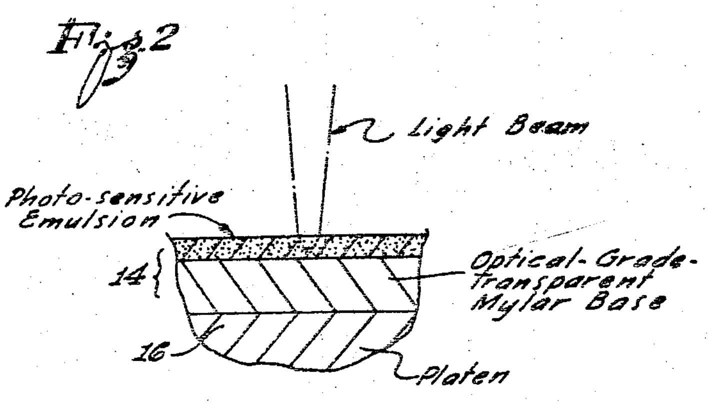
FIGURE 2 is an enlarged view of the recording photographic film strip, and illustrating the manner in which the light beam is focused to a sharp point in the plane of the film strip and below its photo-sensitive emulsion surface.

It is most important in the practice of the invention that the laser light beam from the source 10 be focused to a point at a particular level in the photo-sensitive emulsion layer of FIGURE 2. However, the recording film strip 14 is subject to thickness variations upon changes in ambient conditions of temperature and humidity. To compensate for such ambient changes, a micrometer control 26 is coupled to the platen 16. This micrometer control may have any known construction, and it responds to an electrical control signal to move the platen 16 through a minute displacement towards and away from the rotatable reflecting member 12.

As an alternative, a micrometer position control 28 of any known construction is coupled to the lens 18. This latter micrometer control responds to an applied electrical signal to shift the lens slightly towards or away from the reflecting member 12, so as to control the focus point in FIGURE 2.

A temperature/humidity sensitive sensing element 30 is positioned adjacent the platen 16. The element 30 responds to changes in the ambient conditions in the vicinity of the platen 16, and it applies corresponding electrical signals to a control unit 32.

The control unit 32 applies control signals to the micrometer position control 26 and/or to the micrometer position control 28. These control signals cause the control 26 to move the platen 16 slightly towards or away from the rotatable reflector 12 in response to changes in ambient conditions, as sensed by the element 30. These ambient changes produce corresponding changes in the thickness of the film strip 14, so that the controlled shifts of the platen 16 maintains the upper surface of the film strip 14 in the plane of its particular path.

As an alternative to the control described in the preceding paragraph, or in conjunction therewith, the slight shift in the position of the lens 18 under the control of the position control 28 causes the focus point of the light beam from the reflecting member 12 to be maintained at the desired level in the photosensitive emulsion regardless of thickness variations of the film strip 14.

As noted above, the system of FIGURE 3 includes additional components for the recording system of FIGURE 1 to enable certain edge recordings to be made on the film strip 14. Certain of the components previously described in FIGURE 1 have been omitted from the system of FIGURE 3 for purposes of clarity.

Figures 3, 4:
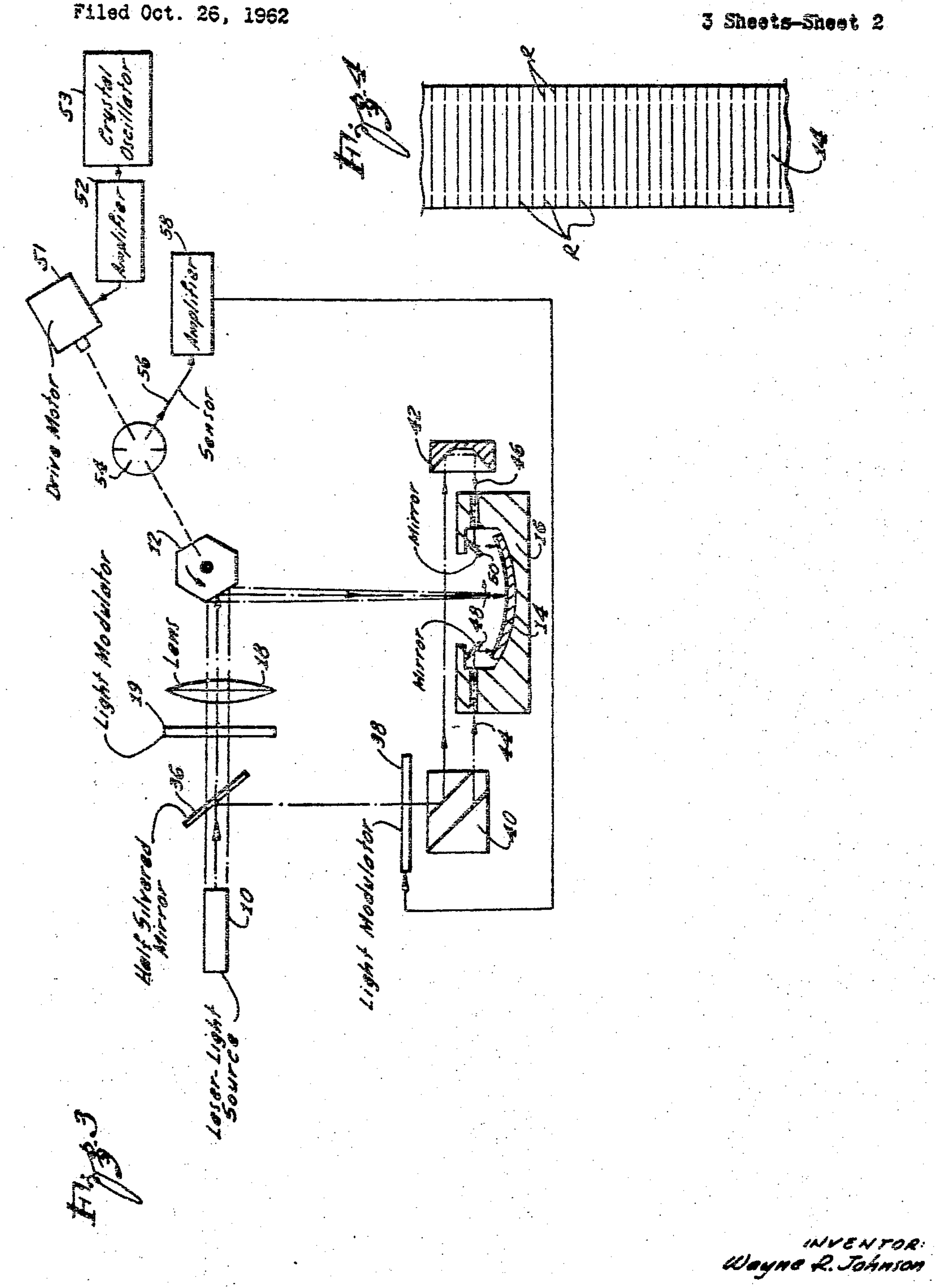
FIGURE 3 is a schematic representation of additional components for the recording of FIGURE 1 which enable particular edge recordings to be made on the film strip for control purposes, as will be described.
FIGURE 4 illustrates a fragment of a film strip bearrecordings formed thereon by the composite system of FIGURES 1 and 3.

In the system of FIGURE 3, a half-silvered mirror 36 is disposed in the path of the laser light beam between the source 10 and the light modulator 19. This half-silvered mirror 36 permits the major portion of the laser light beam to pass through the modulator 19 and through the lens 18 to the rotatable reflector 12. However, a portion of the light beam is reflected by the reflector 19 down through an additional light modulator 38, and through an appropriate prism-type reflector 40 and reflector 42 through respective side apertures 44 and 46 in the platen 16. Mirrors 48 and 50 are provided on the platen 16 to reflect the light beams from the reflectors 40 and 42 down the respective edges of the film strip 14.

The rotatable reflector member 12 is driven by a drive motor 51. The drive motor 51 is rotated at a constant speed by drive power derived from a crystal oscillator 53 through an amplifier 52. A magnetic synchronizing member 54 is mounted for rotation by the drive motor 48 concurrently with the rotation of the reflector 12.

The magnetic synchronizing member 54 has magnetic recordings disposed at equi-angular positions about its periphery, and it has a sensor 56 associated with it. The sensor 56 reads the recordings on the member 54, and it produces electric pulses as the member 54 rotates. These electric pulses are indicative of the angular movement of the polygonal reflecting faces of the reflector member 12. The synchronizing pulses from the sensor 56 are amplified in an amplifier 58 and applied to the light modulator 38.

Therefore, as the rotatable reflector 12 is rotated by the drive motor 51, it causes the laser beam from the laser light source 10 to be recurrently scanned across the film strip 14. At the same time, the synchronizing pulses from the sensor 56 are applied to the light modulator 38, so that a series of recordings "R" (FIGURE 4) are recorded at each edge of the film strip 14, the recordings "R" being in respective alignment with respective ones of the transverse tracks formed by the transverse scanning of the laser light beam, as described above. The recordings "R" are used subsequently, as will be described, for controlling the registration of the scanning beam during the reproduction process in the system of FIGURE 5.

Figure 5:
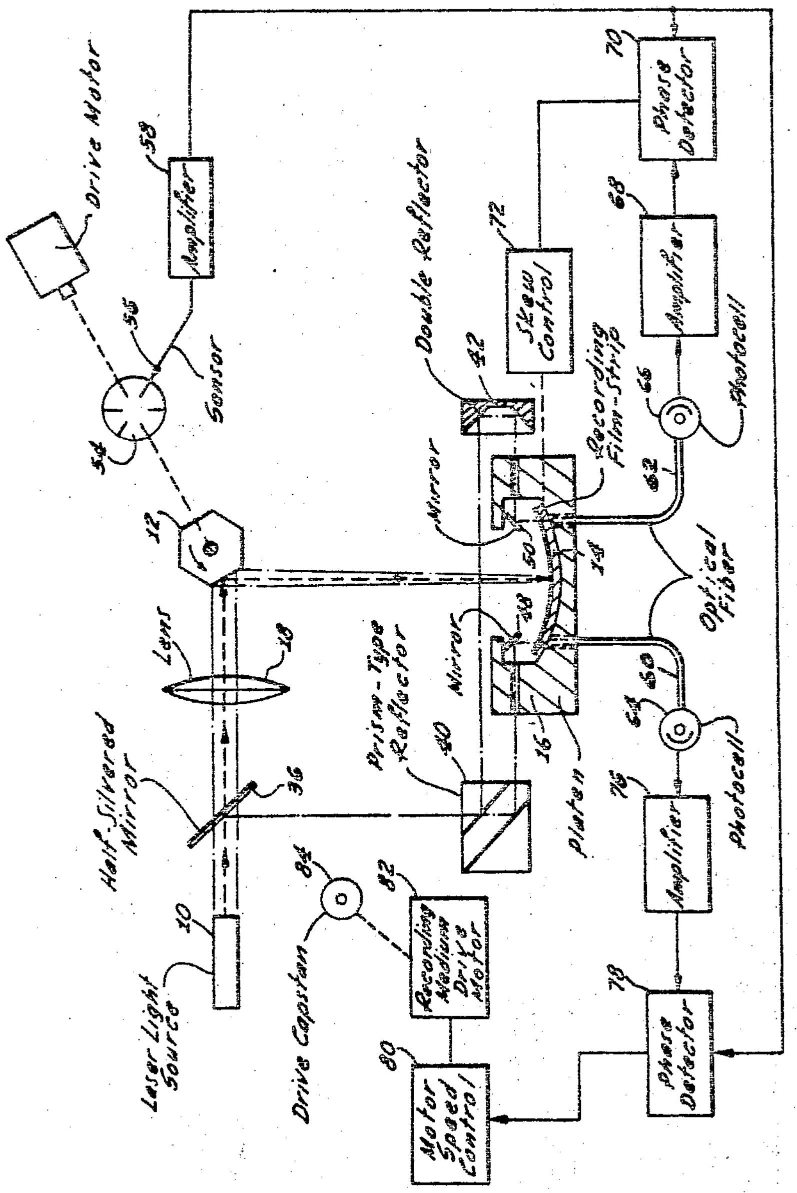
FIGURE 5 is a schematic representation of an optical system for reproducing the information recorded on a film strip by the recording system of FIGURES 1 and 3.

Many of the components used in the reproducing system of FIGURE 5 are similar to those used in the recording system of FIGURES 1 and 3, and such components have been designated by the same numbers.

In the reproducing system of FIGURE 5, the laser light beam from the source 10 is directed through the half-silvered mirror 36 and through the lens 18 to the surface of the rotatable reflector 12. For reproducing purposes, the laser light beam is unmodulated, and it is recurrently scanned across the film strip 14. The scanned laser light beam must be maintained in registry with the transverse recording tracks on the film strip, as recorded by the system of FIGURES 1 and 3, so that the information contained in these tracks may be reproduced.

As the light beam is scanned across the film strip 14 in the reproducing system of FIGURE 5, it is modulated in accordance with the recordings on the film strip. The resulting modulated beam is directed through the platen 16 to an appropriate photo-cell (not shown) so that the recording may be converted into corresponding electrical signals for subsequent utilization.

The auxiliary light beam produced by the half-silvered mirror 36 is again reflected to the edges of the film strip 14 as two distinct beams. The reflected beams are modulated by the recordings "R" on the edges of the film strip, and the resulting modulated light beams are passed through a pair of optical fibers 60 and 62 to corresponding photo-cells 64 and 66. The photo-cells produce corresponding electrical pulses in response to the modulated light beams directed thereto.

The optical fibers as is is known to the art, are transparent fibers which are used generally to conduct light along selected paths. The fiber may be flexible to conduct the light through tortuous channels. A description of optical fibers may be found in the McGraw-Hill Encyclopedia of Science and Technology, published 1960, by the McGraw-Hill Book Co., Inc.

The pulses from the photo-cell 66, for example, are amplified in an amplifier 68 and applied to a phase detector 70. The synchronizing pulses from the sensor 56, as amplified by the amplifier 58, are also applied to the phase detector 70, and the resulting phase error signal is applied to a skew control 72. The skew control 72 may be any appropriate solenoid type control, and it mechanically coacts with the edges of the film strip 14 to realign the film should skewing occur.

The presence of skewing of the film strip 14 is evidenced by a phase displacement between the modulated light signals passed by the optical fiber 62 and the synchronizing pulses from the amplifier 58. So long as these signals are in phase, the film strip 14 is being drawn true along its path. However, any skewing of the film strip produces an out-of-phase condition, and the resulting phase error signal from the phase detector 70 causes the skew control 72 to correct the condition.

The pulses from the photo-cell 64 are amplified in an amplifier 76 and applied to a phase detector 78. The pulses from the amplifier 58 are also applied to the phase detector 78 and the phase error signal from the phase detector is applied to a usual type of motor speed control system 80.

The speed control system 80 controls the speed of the recording medium drive motor 82 which, for example, is coupled to a drive capstan 84. The drive capstan 84 draws the recording film strip 14 along its predetermined path in any known manner. The recording medium drive motor 82 may, of course, be directly coupled to any other type of drive mechanism for the film strip 14.

It is most important during the reproduction process that the transversely scanned laser light beam is maintained in registry with the transverse recordings on the film strip. The reproducing system of FIGURE 5 is controlled, so that should the speed of the film strip change to cause the laser light beam to become misaligned with the transverse recordings on the film, the resulting phase error signal from the phase detector 78 causes the speed of the film strip to be varied in a manner to compensate for such misregistration.

Therefore, the reproducing system of FIGURE 5 includes appropriate controls to assure that the film strip is driven at the proper speed and without skewing, so that exact registry between the scanning light beam and the transverse recordings on the film strip is assured.

The invention provides, therefore, an improved optical recording system which is capable of high speed, high density recording for signals through a wide frequency range.

The improved system of the invention is controlled so that the recordings may be made with precision and exactness, and so that subsequent reproduction may be made with exact registration between the scanning beam and the transverse recordings on the film strip.

While a particular embodiment of the invention has been shown and described, modifications may be made, and it is intended in the claims to cover such modifications which fall within the spirit and scope of the invention.

What is claimed is:

1. In combination: a light source for producing light in the form of a high intensity light beam; means for moving a photographic film strip along a particular path; means disposed in the path of said light beam for directing said light beam to said film strip; means coupled to said directing means for causing said directing means to scan said light beam transversely across said film strip; platen means for supporting said film strip; micrometer adjustment means mechanically coupled to said platen to adjust the position of said platen towards and away from said directing means; and ambient condition sensing control means coupled to said micrometer adjustment means for causing said platen to shift so as to compensate for changes in thickness of said film strip due to variations in ambient conditions.

2. The combination defined in claim 1 and which includes: a lens interposed between said light source and said directing means for focusing said light beam in the plane of said film strip; further micrometer adjustment means mechanically coupled to said lens for adjusting the position of said lens towards and away from said directing means; and in which said ambient condition sensing control means is coupled to said further micrometer adjustment means for causing said lens to maintain said light beam focused in the plane of said film strip in the presence of variations in the effective position of said plane due to varying ambient conditions.

3. In combination: a light source for producing light in the form of a first high intensity light beam; means for moving a photographic film strip along a particular path; a rotatable reflecting member having a polygonal peripheral configuration disposed in the path of said light beam for reflecting said light beam to said film strip;

means coupled to said reflecting member for imparting rotational motion thereto so as recurrently to scan said light beam transversely across said film strip; a synchronizing member coupled to said rotatable reflecting member for producing synchronizing signals indicative of the angular positions of said reflecting member; means for producing a second light beam; means for directing said second light beam to at least one edge of said film strip; and modulating means disposed in the path of said second light beam and coupled to said synchronizing member, said modulating means being responsive to said synchronizing signals for causing recordings to be made on the edge of said film strip indicative of successive transverse paths of said first light beam as said first beam is scanned transversely across said film strip.

4. In combination: a light source for producing light in the form of a high intensity light beam; means for drawing a photographic film strip along a particular path, said film strip having recordings at the edges thereof in registry with successive transverse recording tracks on the film strip; a rotatable reflecting member having a polygonal peripheral surface and disposed in the path of said light beam for directing said light beam to said film strip; means coupled to said reflecting member for imparting rotational movement thereto so as to cause said reflecting member to scan said light beam transversely across said film strip; means for producing a second light beam; further reflecting means positioned in the path of said second light beam for causing said second light beam to be reflected as a pair of beams on the edges of said film strip and be modulated by the recordings at said edges; photoelectric cell means disposed in the paths of at least one of the modulated pair of beams and responsive thereto for producing corresponding electrical signals; and control means coupled to said photo-cell means and responsive to the electrical signals therefrom for controlling said film strip.

5. In combination: a laser light source for producing light in the form of a high intensity light beam; means for moving a photographic film strip along a particular path; a rotatably mounted reflecting member disposed in the path of said laser light beam and having a polygonal peripheral surface for recurrently reflecting said light beam transversely across said film strip; means coupled to said reflecting member for imparting rotational motion thereto to cause said light beam to be recurrently scanned transversely across said film strip; and vacuum-actuated platen means for supporting said film strip in the path of said transversely scanned light beam, including synchronizing means including a magnetic member coupled to said rotatably mounted reflecting member for producing synchronizing pulses indicative of the angular positions of said reflecting member; means for producing a second light beam; reflecting means disposed in the path of said second light beam for directing said second light beam to the edges of said film strip; and light modulating means disposed in the path of said second light beam and coupled to said synchronizing means; said modulating means being responsive to said synchronizing pulses produced by said synchronizing means to provide recordings on the edges of said film strip in registry with successive paths across said film strip of said transversely scanned light beam.

References Cited in the file of this patent

UNITED STATES PATENTS

| | | |
|---|---|---|
| 2,787,214 | Halahan et al. | Apr. 2, 1957 |
| 2,898,176 | McNaney | Aug. 4, 1959 |
| 2,945,414 | Blackstone | July 19, 1960 |
| 2,999,436 | Faulhaber | Sept. 12, 1961 |
| 3,008,792 | Cox | Nov. 14, 1961 |
| 3,059,111 | Boyle et al. | Oct. 16, 1962 |